US011360731B2

United States Patent
Eade et al.

(10) Patent No.: US 11,360,731 B2
(45) Date of Patent: Jun. 14, 2022

(54) SHARING NEIGHBORING MAP DATA ACROSS DEVICES

(71) Applicant: Microsoft Technology Licensing, LLC, Redmond, WA (US)

(72) Inventors: Ethan Eade, Pittsburgh, PA (US); Jeroen Vanturennout, Snohomish, WA (US); Jonathan Lyons, Kirkland, WA (US); David Fields, Kirkland, WA (US); Gavin Dean Lazarow, Redmond, WA (US); Tushar Cyril Bhatnagar, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/600,340

(22) Filed: Oct. 11, 2019

(65) Prior Publication Data
US 2020/0042278 A1    Feb. 6, 2020

Related U.S. Application Data

(63) Continuation of application No. 15/593,147, filed on May 11, 2017, now Pat. No. 10,466,953.
(Continued)

(51) Int. Cl.
*G06F 3/14*      (2006.01)
*G06T 19/00*    (2011.01)
(Continued)

(52) U.S. Cl.
CPC ......... *G06F 3/1454* (2013.01); *B65G 1/0492* (2013.01); *G02B 27/017* (2013.01); *G03H 1/0005* (2013.01); *G03H 1/2249* (2013.01); *G06F 3/012* (2013.01); *G06F 3/04815* (2013.01); *G06F 3/147* (2013.01);
(Continued)

(58) Field of Classification Search
CPC ...... G06F 3/1454; G06F 3/012; G06F 3/1423; B65G 1/0492; G02B 27/0103; G03H 1/0005; G03H 1/2249
See application file for complete search history.

(56) References Cited

U.S. PATENT DOCUMENTS 10,748,302 B1 *   8/2020   Dine ................ G06T 7/579
10,970,874 B2 *   4/2021   Bang ............... G06V 20/10
(Continued)

OTHER PUBLICATIONS

McDonald, John, et al. "Real-time 6-DOF multi-session visual SLAM over large-scale environments." Robotics and Autonomous Systems 61.10 (2013): 1144-1158.*
(Continued)

*Primary Examiner* — Sarah Lhymn
(74) *Attorney, Agent, or Firm* — Alleman Hall Creasman & Tuttle LLP

(57) ABSTRACT

A computing device and method are provided for transmitting a relevant subset of map data, called a neighborhood, to enable mutual spatial understanding by multiple display devices around a target virtual location to display a shared hologram in the same exact location in the physical environment at the same moment in time. The computing device may comprise a processor, a memory operatively coupled to the processor, and an anchor transfer program stored in the memory and executed by the processor.

16 Claims, 11 Drawing Sheets

Related U.S. Application Data

(60) Provisional application No. 62/479,200, filed on Mar. 30, 2017.

(51) Int. Cl.

| | | |
|---|---|---|
| *G06F 3/01* | (2006.01) | |
| *G03H 1/00* | (2006.01) | |
| *G03H 1/22* | (2006.01) | |
| *B65G 1/04* | (2006.01) | |
| *G06F 3/147* | (2006.01) | |
| *G06F 3/04815* | (2022.01) | |
| *G02B 27/01* | (2006.01) | |
| *G09G 3/00* | (2006.01) | |

(52) U.S. Cl.
CPC .......... *G06F 3/1423* (2013.01); *G06T 19/006* (2013.01); *G09G 3/002* (2013.01); *G09G 3/003* (2013.01); *G02B 2027/0138* (2013.01); *G02B 2027/0141* (2013.01); *G03H 2001/0088* (2013.01); *G03H 2001/2252* (2013.01); *G03H 2226/02* (2013.01); *G03H 2226/04* (2013.01); *G03H 2226/05* (2013.01); *G05B 2219/40126* (2013.01); *G05D 2201/0216* (2013.01); *Y10S 901/01* (2013.01)

(56) References Cited

U.S. PATENT DOCUMENTS

2014/0323148 A1* 10/2014 Schmalstieg ......... H04W 4/029
455/456.1
2018/0288386 A1* 10/2018 Lazarow .............. H04N 13/128

OTHER PUBLICATIONS

Ataer-Cansizoglu, E., Taguchi, Y., Ramalingam, S., & Garaas, T. (2013). Tracking an RGB-D camera using points and planes. In Proceedings of the IEEE International Conference on Computer Vision Workshops (pp. 51-58).*

Dave, Achal, Olga Russakovsky, and Deva Ramanan. "Predictive-corrective networks for action detection." Proceedings of the IEEE conference on computer vision and pattern recognition. 2017.*

* cited by examiner

SHARING NEIGHBORING MAP DATA ACROSS DEVICES

CROSS REFERENCE TO RELATED APPLICATIONS

This application is a continuation from U.S. patent application Ser. No. 15/593,147 filed May 11, 2017, which claims priority to U.S. Provisional Patent Application No. 62/479,200 filed Mar. 30, 2017, the entirety of each of which are hereby incorporated herein by reference.

BACKGROUND

6-DoF tracking, also known as six degrees of freedom tracking, is a method by which a device (e.g. mixed-reality head-mounted device (HMD), robot, smartphone, etc.) uses sensors (e.g. cameras, inertial measurement units, etc.) to determine its position relative to its surrounding physical environment. For example, a mixed-reality HMD or smartphone can use this positional understanding to place holograms or digital content so as to appear to be world-locked to a position in the physical world, and a robot can use this positional understanding to navigate itself relative to its surroundings. Recently, scenarios have arisen in which it is useful to have two or more such devices operating with a common understanding of their positions relative to a physical environment, and thus relative to each other. As discussed in detail below, there are several general approaches to developing this common understanding of positions between such devices, each with significant challenges recognized by the inventors.

SUMMARY

To address these issues, a computing device and method are provided for transmitting a relevant subset of map data, called a neighborhood, to enable mutual spatial understanding by multiple display devices around a target virtual location to display a shared hologram in the same exact location in the physical environment at the same moment in time. The computing device may comprise a processor, a memory operatively coupled to the processor, and an anchor transfer program stored in the memory and executed by the processor.

The anchor transfer program may be configured to receive a request to transfer anchor data of a target virtual place-located anchor at a target virtual location from a first display device to a second display device. Subsequently, the program may be configured to retrieve and transmit to the first display device neighboring map data corresponding to the target virtual location. Subsequent to the first display device transferring the anchor data and the neighboring map data to the second display device, the second display device incorporates the neighboring map data into existing map data of the second display device, and the second display displays the one or more holograms to a second user at the target virtual place-located anchor at the target virtual location from the second user's vantage point based on the incorporated map data and the existing map data of the second display device. The neighboring map data is map data of a neighborhood around the target virtual location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
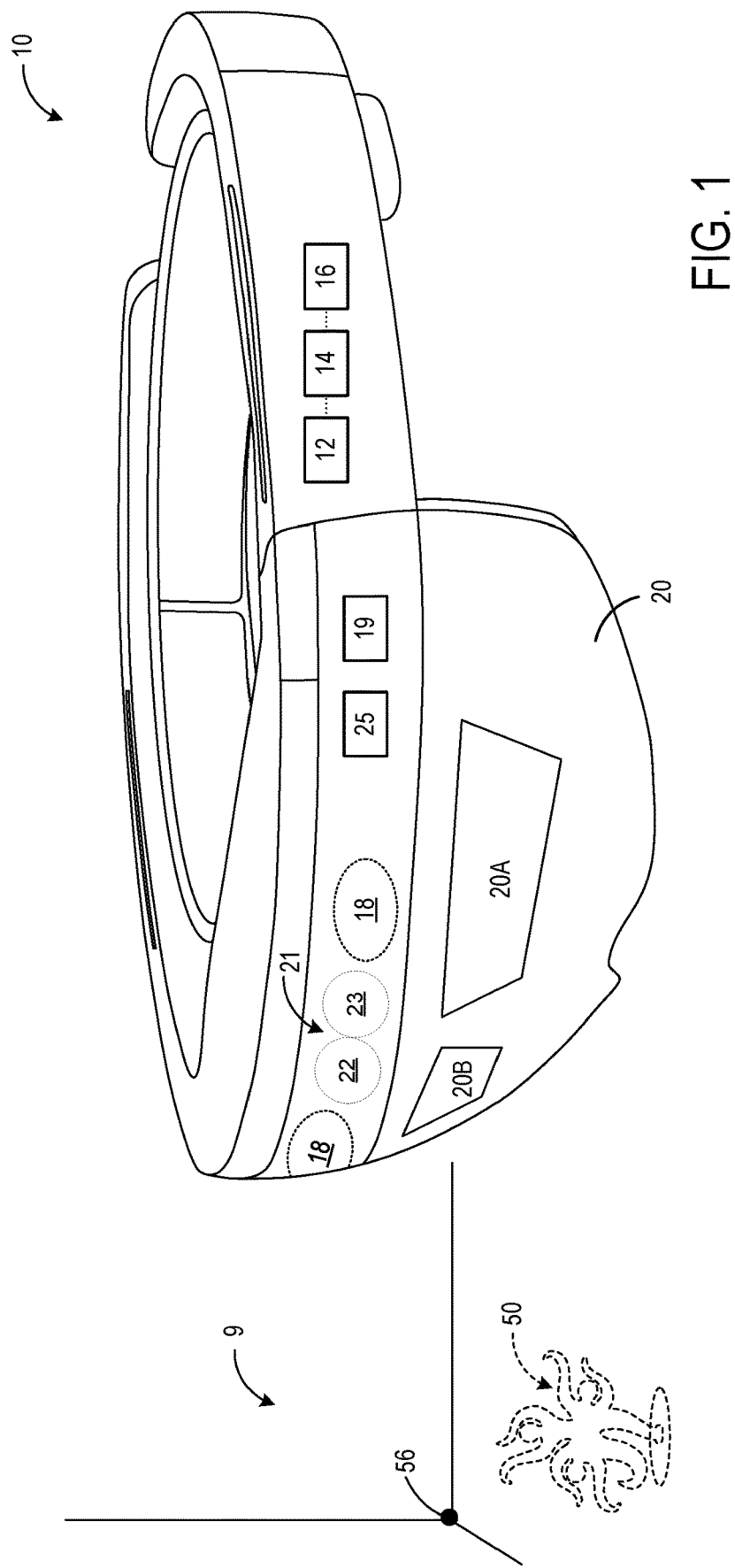
FIG. 1 shows a computing device in the form of a head-mounted display device, according to an example embodiment of the present disclosure.

As discussed briefly above, of increasing value is the ability for two or more devices that use 6-DoF tracking to operate with a common understanding of their positions relative to the physical environment, and thus relative to each other. With this common spatial understanding, devices can interact with each other and the physical environment, enabling scenarios such as the sharing of holograms positioned in the world, or robots working together. The inventors have recognized that current approaches to enable two or more devices to align their coordinates in three-dimensional space have associated drawbacks that pose barriers to their adoption.

For example, a first approach to tracking device position is known as outside-in tracking. Outside-in tracking uses sensors external to the device in the physical environment to track or help track device position. While this approach can determine position of two or more devices, it requires positioning sensors external to the device, which can be inconvenient or impractical in some situations.

A second approach to tracking device position is known as inside-out tracking. Inside-out tracking is a method by which a display device can determine its position without the help of external sensors in the environment. While this approach has the advantage of not requiring external sensors to track position, the position data is determined within each device. Therefore, a challenge remains to coordinate alignment of the devices relative to each other.

One conventional method of attaining 6-DoF coordinate alignment for two or more inside-out tracking devices is to use identified posters or markers as well-understood mutual points of reference in the physical environment, so that each device establishes its position in relation to these. However, one limitation associated with this poster method is that the physical environment needs to be changed with each additional poster, which adds to cost and setup time, and decreases spontaneity. Moreover, if the posters are moved or changed, any common spatial understanding between the devices must change with respect to the posters, thereby reducing reliability. This method also limits the physical scope of the shared coordinates, as the devices need to be within operating range of the posters in the physical environment.

Another conventional method is for devices to independently generate maps that are transmitted to a central server and stitched together to form a common map, which is then retransmitted back to each respective device.

However, this approach has the drawback that it can result in slow transmission times, as large amounts of data transfer would be required over the network to transmit the map from each device to the server, and then again to transmit the common (stitched) map from the server to each of the devices. Moreover, the devices that load the common map may experience unwanted loss of local map data, since previously existing map data within each destination device may be overwritten, removed, or deleted in the course of sharing the common map with all the destination devices, and since the common map may not retain with 100% fidelity the map data from each contributing device.

FIG. 1 illustrates a computing device 10 in the form of a head mounted display device 10, according to one embodiment of the present disclosure, which has been conceived to address the issues discussed above. As shown, the computing device 10 includes processor 12, volatile storage device 14, non-volatile storage device 16, cameras 18, display 20, active depth camera 21. The processor 12 is configured to execute software programs stored in non-volatile storage device 16 using portions of volatile storage device 14 to perform the various functions recited herein. In one example, the processor 12, volatile storage device 14, and non-volatile storage device 16 may be included in a system-on-chip configuration included in the head mounted display device 10. It will be appreciated that the computing device 10 may also take the form of other types of mobile computing devices, such as, for example, a smartphone device, a tablet device, a laptop, a machine vision processing unit for an autonomous vehicle, robot, drone, or other types of autonomous devices, etc. In the systems described herein, devices in the form of computing device 10 may be utilized as a first display device and a second display device, as illustrated in FIGS. 2-9B, discussed below.

Display 20 is configured to be at least partially see-through, and includes right and left display regions 20A, 20B which are configured to display different images to each eye of the user. By controlling the images displayed on these right and left display regions 20A, 20B, a hologram 50 may be displayed in a manner so as to appear to the eyes of the user to be positioned at a distance from the user within the physical environment 9. As used herein, a hologram is an image formed by displaying left and right images on respective left and right near-eye displays that appears due to stereoscopic effects to be positioned at a distance from the user. Typically, holograms are anchored to the map of the physical environment by virtual anchors 56, which are placed within the map according to their coordinates. These anchors are world-locked, and the holograms are configured to be displayed in a location that is computed relative to the anchor. The anchors may be placed in any location, but are often placed in positions at locations where features exist that are recognizable via machine vision techniques. Typically, the holograms are positioned within a predetermined distance from the anchors, such as within 3 meters in one particular example.

In the configuration illustrated in FIG. 1, a plurality of cameras 18 are provided on the computing device 10 and are configured to capture images of the surrounding physical environment of the computing device 10. In one embodiment, four cameras 18 are provided, although the precise number of cameras 18 may vary. The raw images from the cameras 18 may be stitched together with perspective correction to form a 360 degree view of the physical environment, in some configurations. Typically, cameras 18 are visible light cameras. Images from two or more of the cameras 18 may be compared to provide an estimate of depth, using passive stereo depth estimation techniques.

In addition to visible light cameras 18, a depth camera 21 may be provided that uses an active non-visible light illuminator 23 and non-visible light sensor 22 to emit light in a phased or gated manner and estimate depth using time-of-flight techniques, or to emit light in structured patterns and estimate depth using structured light techniques.

Computing device 10 also typically includes a six degree of freedom inertial motion unit 19 that includes accelerometers, gyroscopes, and possibly magnetometers configured to measure the position of the computing device in six degrees of freedom, namely x, y, z, pitch, roll and yaw.

Data captured by the visible light cameras 18, the depth camera 21, and the inertial motion unit 19 can be used to perform simultaneous location and mapping (SLAM) within the physical environment 9, to thereby produce a map of the physical environment including a mesh of reconstructed surfaces, and to locate the computing device 10 within the map of the physical environment 9. The location of the computing device 10 is computed in six degrees of freedom, which is important to displaying world-locked holograms 50 on the at least partially see through display 20. Without an accurate identification of the position and orientation of the computing device 10, holograms 50 that are displayed on the display 20 may appear to slightly move or vibrate relative to the physical environment, when they should remain in place, in a world-locked position. This data is also useful in relocating the computing device 10 when it is turned on, a process which involves ascertaining its position within the map of the physical environment, and loading in appropriate data from non-volatile memory to volatile memory to display holograms 50 located within the physical environment.

The IMU 19 measures the position and orientation of the computing device 10 in six degrees of freedom, and also measures the accelerations and rotational velocities. These values can be recorded as a pose graph to aid in tracking the display device 10. Accordingly, even when there are few visual cues to enable visual tracking, in poorly lighted areas or texture-less environments for example, accelerometers and gyroscopes can still enable spatial tracking by the display device 10 in the absence of visual tracking. Other components in the display device 10 may include and are not limited to speakers, microphones, gravity sensors, Wi-Fi sensors, temperature sensors, touch sensors, biometric sensors, other image sensors, eye-gaze detection systems, energy-storage components (e.g. battery), a communication facility, etc.

Figure 2:
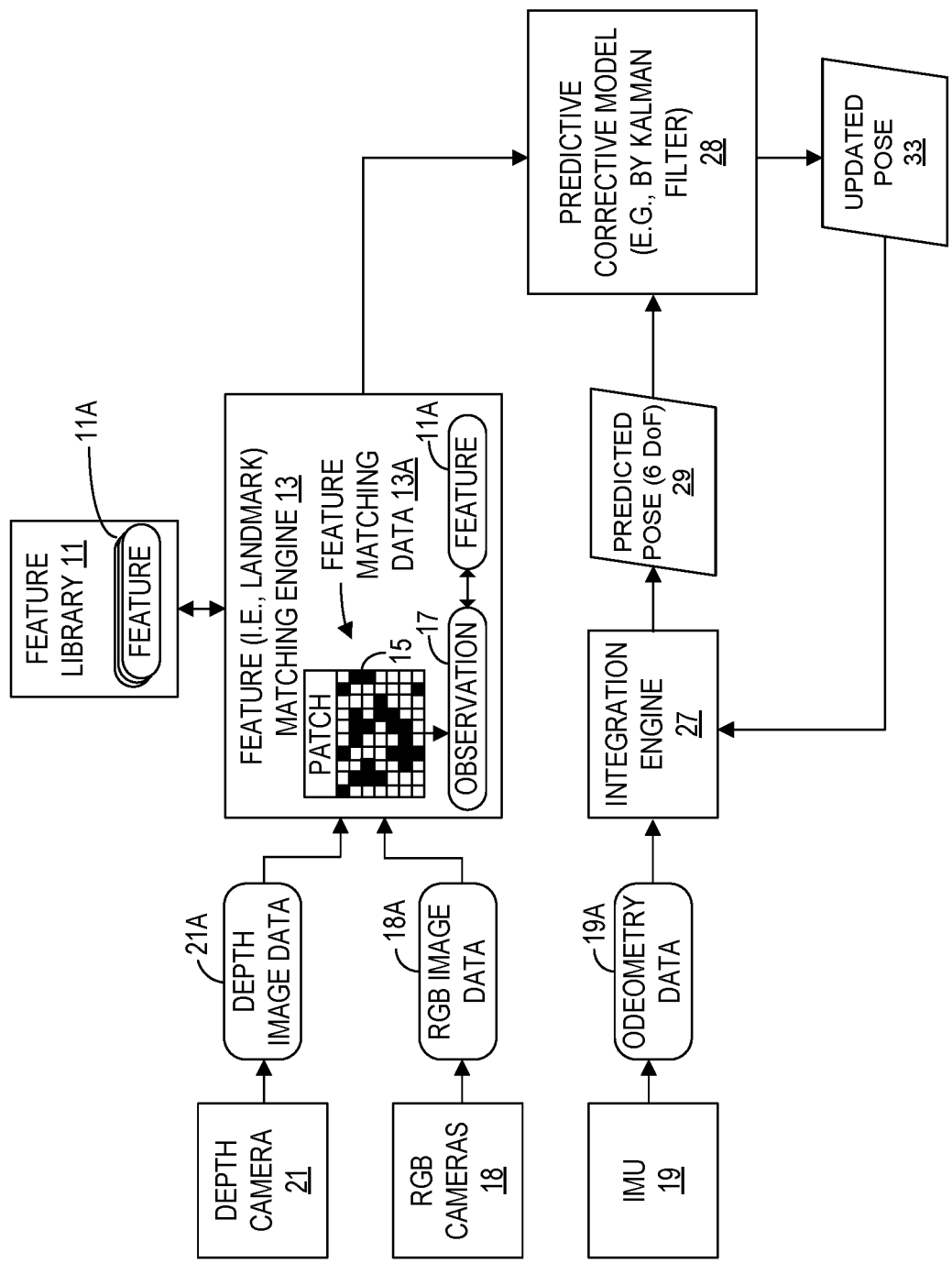
FIG. 2 is a schematic view of an example predictive corrective algorithm for simultaneous location and mapping by the computing device of FIG. 1 within a physical environment.

FIG. 2 illustrates a general overview of one possible SLAM algorithm for simultaneous location and mapping by computing device 10. According to the SLAM algorithm, a predictive corrective model 28 is typically applied, which may, for example, be a Kalman filter. In each frame (i.e., timestep), a predicted pose 29 in a next frame is computed based on odeometry data 19A from IMU 19 by an integration engine 27, and then a correction to the predicted pose 29 is computed by the predictive corrective model (e.g., Kalman filter) 28 based on estimated and observed positions of features in the physical environment 9 sensed by sensors such as cameras 18 and depth camera 21, and finally the predicted pose 29 is updated and an updated pose 33 is fed back to the integration engine 27, for computing the predicted pose 29 at the subsequent time step. Additional sensors such as LIDAR, microphone arrays, etc. may also be used to obtain observations of features in the environment which may be used to compute the correction and updated pose by the predictive corrective model 28.

Feature descriptors 11A that describe features such as edges, corners, and other patterns that are detectable through image processing techniques are prestored in a feature library 11 in non-volatile storage device 16. Particular observations of features matching feature descriptors 11A (i.e., feature instances that are detected in a region of interest of an image) may or may not have anchors 56 collocated with them (generally most will not, but some may). The location of each anchors is typically determined by users of the system, but may be programmatically determined as well. In real time, images 18A and depth images 21A are respectively captured by cameras 18 and depth camera 21, and processed by a feature matching engine 13 executed by processor 12 to detect whether features matching the prestored feature descriptors 11A are present in the captured images 18A, 21A by looking for regions in the captured images that match the feature descriptors 11A. For each detected feature, the location (e.g., coordinate area) and type of the feature are stored as observation data 17 associated with each frame. It will be appreciated that dozens or hundreds of such features matching the features descriptors 11A may be recognized in an image, and the collection of these observations 17 of features may be referred to informally as a pointcloud of detected features in the image. Further, for at least selected detected features in the image, a patch 15 from the image is taken surrounding the selected detected features and stored in memory for later recall. This patch 15 is typically a two-dimensional array of pixels or voxels from the region of the captured image, and can be used in future localization steps when the computing device 10 captures images of the selected detected features from another angle, by performing perspective correction on the patch to determine whether (and where) the selected detected features in the perspective corrected patch are present in the subsequent image. The features matching feature descriptors 11A, observations 17, and patches 15 for each frame are collectively referred to as feature matching data 13A. The feature matching data 13A typically does not include the depth image 21A or RGB image data 18A. The feature matching data 13A may be stored in non-volatile or volatile memory for certain of the frames, referred to as keyframes, as discussed below. Together, the pose graph 80, feature matching data 13A, surface reconstruction data 82, and keyframes 84 linked by pose graph 80 may collectively be referred to as map data 86. As the computing device 10 moves throughout the physical environment 9, it maps the environment and stores its aggregated knowledge of the environment as map data 86. As will be discussed below, sharing of a portion of this aggregated map data with another device, either directly or through intermediary devices such as a server, can enable other devices to more quickly and accurately localize themselves within the physical environment, saving time and processing power for the other devices.

Figure 3:
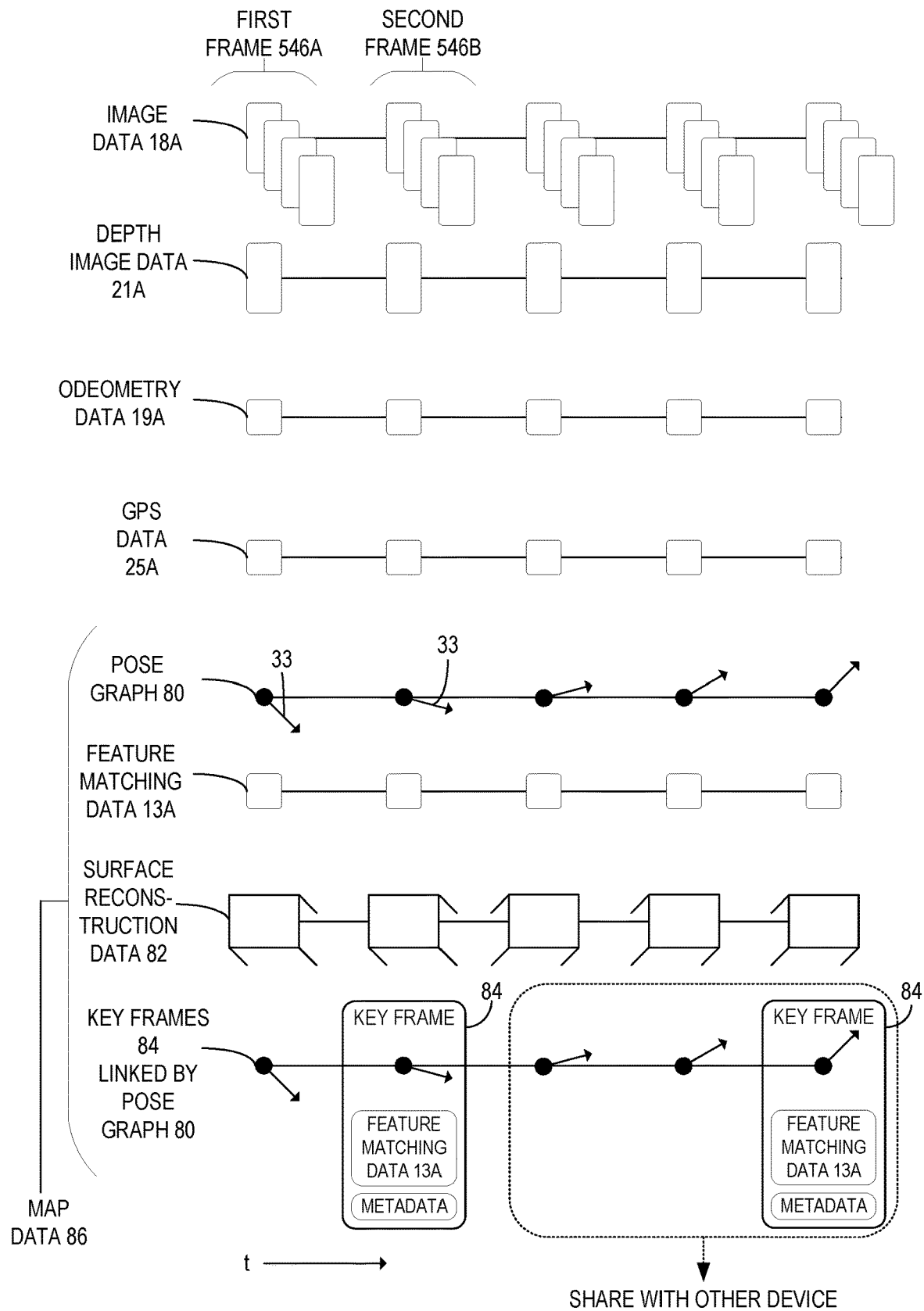
FIG. 3 is a time series view of data captured by various sensors of the computing device of FIG. 1 and processed to generate a series of key frames linked by a pose graph.

FIG. 3 shows an example schematic representation of data collected by the cameras 18, depth camera 21, IMU 19, and GPS receiver 25 in the sensor suite of the computing device 10, and processed by the processor 12 of the computing device 10. The data points in FIG. 3 are shown arranged along a time axis, where later times are shown to the right of earlier times. Typically, data is collected periodically from each sensor, at a sampling rate. The sampling rate of the various sensors is depicted to be quantized at the same sampling rate in the figure for ease of illustration (although in practice the sampling rates may differ), and each timestep at which data is sampled from the sensors is referred to as a frame 546. Thus, in the first frame 546A, second frame 546B, and each frame thereafter, image data 18A is collected by cameras 18 (four cameras in this example), depth camera data 21A is collected using depth camera 21, odeometry data 19A is collected by IMU 19, and GPS data 25A is collected by GPS receiver 25.

The processor 12 may use simultaneous localization and mapping (SLAM) techniques, discussed above, based on sensor suite inputs include the image data 18A, depth image data 21A, odeometry data 19A, and GPS data 25A to generate pose graph 80, feature matching data 13A, and surface reconstruction data 82. The pose graph 80 is a directed graph with nodes that are a series of updated poses 33 detected over time. A pose is typically a unit vector with an origin at a predetermined location (x, y, and z) and extending in a predetermined orientation (pitch, yaw, and roll) in the physical space, and is calculated as described in relation to FIG. 2. The origin corresponds to a predetermined fixed location on the computing device, such as equidistant between the left and right displays, and the unit vector extends outward in at a fixed attitude from the display, in a gaze direction of the user. The processor 12 typically generates the pose graph 80 in each frame, but alternatively may generate the pose graph 80 less often, such as every other frame, etc. The surface reconstruction data 82 typically includes a mesh of detected surfaces in the physical environment that have been detected using depth image data 21A and/or stereoscopic analysis of the image data 18A. As discussed above, the feature data 13A typically includes one or more patch, observation, and/or feature descriptor associated with each pose of the pose graph 80.

The processor 12 may generate and store in memory key frame data which includes a plurality of key frames 84. Each key frame 84 includes one pose of the pose graph 80, and thus the key frames 84 are linked by the pose graph 80. Each key frame 84 further includes the feature matching data 13A, which includes one or more (and typically multiple) observations 17, features matching feature descriptors 11A, and associated patch 15 for that frame. The key frame data may further include metadata, which may for example include GPS data 25A, odeometry data 19A, hardware data (e.g., camera lens type), ambient temperature, etc. applicable for the frame. The key frames 84 may be generated at a periodic interval within the series of successive frames, such as every other frame, or every $10^{th}$ frame, etc. Alternatively, key frames 84 may be generated at a predetermined spatial interval as the computing device 10 moves through the physical environment 9, such as every 1 or 2 meters.

Figure 4:
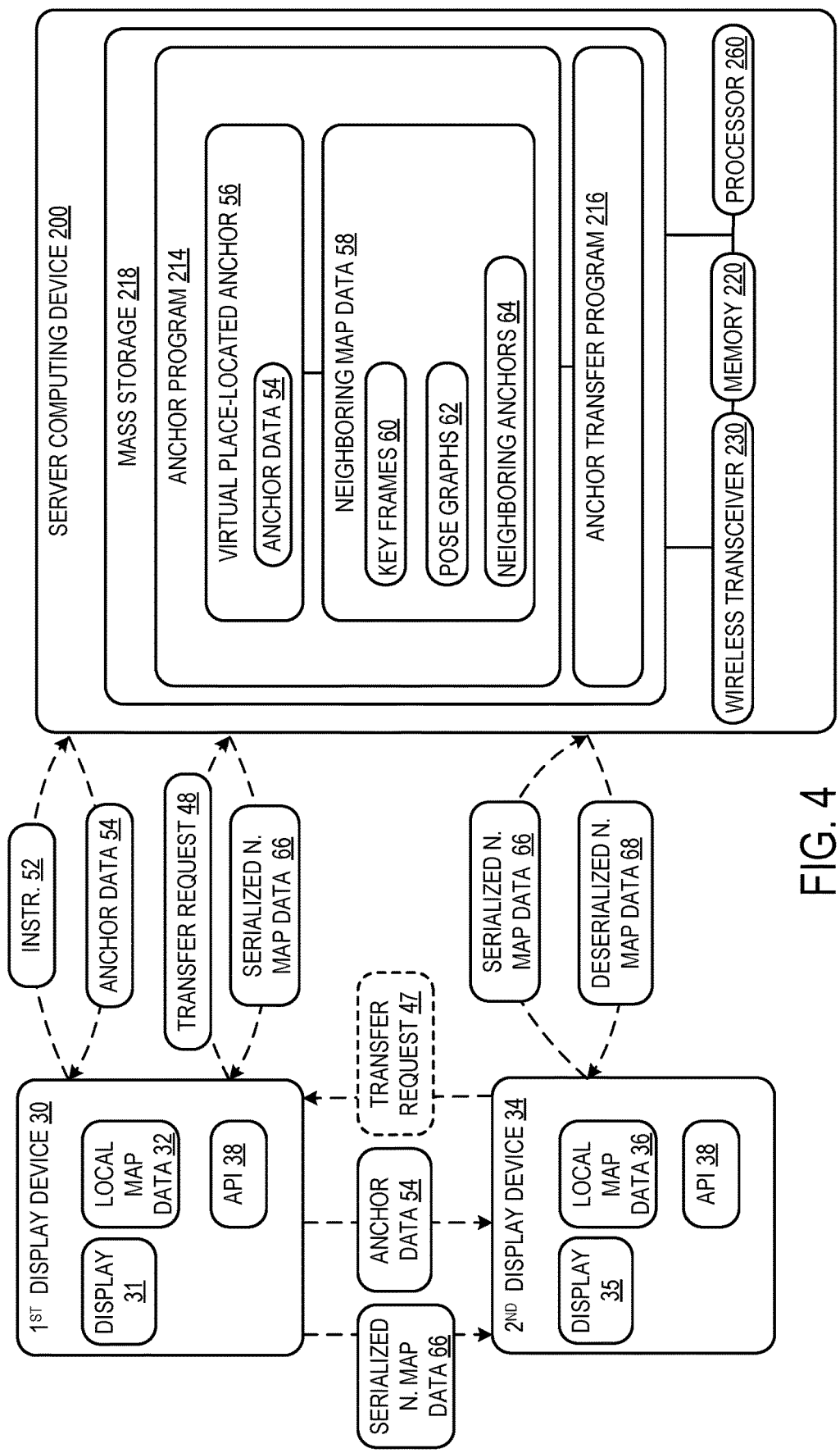
FIG. 4 is a schematic view of a computing device for generating a virtual place-located anchor and sending neighboring map data according to an example of the present disclosure.

FIG. 4 is a schematic illustration of a server computing device 200 interacting with display devices 30 and 34 according to an embodiment of the present disclosure. As explained in more detail below, the server computing device 200 may be used to generate a virtual place-located anchor 56 at a target virtual location. The target virtual location may be world-locked to a position that is fixed in a three-dimensional coordinate space overlaid upon a real world three-dimensional environment. Alternatively, the target virtual location may be world-locked to a position relative to an object in a real world three-dimensional environment. An example hardware configuration for the server device 200 is described in more detail below with respect to FIG. 10.

The server computing device 200 may include an anchor program 214 and an anchor transfer program 216 that may be stored in mass storage 218 of the computing device. The anchor program 214 and anchor transfer program 216 may be loaded into memory 220 and executed by a processor 260 of the server computing device 200 to perform one or more of the methods and processes for generating a virtual place-located anchor 56 and transferring anchor data 54 and neighboring map data 58 from a first display device 30 to a second display device 34, as described in more detail below. The server computing device 200 may be configured with a wireless transceiver 230 that wirelessly communicates with the first display device 30 and the second display device 34 to receive instructions 52 and transfer requests 48 from the display devices and transmits map data to the display devices. It will be appreciated that neighboring map data 58 is map data of the neighborhood around the virtual location where the virtual place-located anchor 56 is situated. The type of map data applied in the present disclosure is not particularly limited, and will be understood to be any set of data that correlates points in the three-dimensional coordinate space in the physical environment to information that help orient and locate the display device in the three-dimensional space. One possible embodiment of this map data is described in more detail below with respect to FIG. 7, and includes keyframes 60, poses 62, and neighboring anchors 64. The format of the anchor data 54 is not particularly limited, and may be encoded as unique string identifiers, which identify the anchor, and coordinates, which identify the position of the anchor within the map.

The server computing device 200 may be communicatively coupled to one or more other devices via a wired connection or a wireless connection to a network. In some examples, the network may take the form of a local area network (LAN), wide area network (WAN), wired network, wireless network, personal area network, or a combination thereof, and may include the Internet. In the example of FIG. 4, server computing device 200 is communicatively coupled to a first display device 30 and a second display device 34 via one or more networks. In other examples the server computing device 200 may be operatively connected with fewer or additional devices. The display 31 of the first display device 30 and the display 35 of the second display device 34 may display one or more holograms at the virtual place-located anchor 56 from the vantage points of the respective devices. In some examples, the virtual location of the virtual place-located anchor 56 may be world-locked to a virtual position that is fixed in a three-dimensional coordinate space overlaid upon the real world three-dimensional environment. In other examples, the virtual location of the virtual place-located anchor 56 may be world-locked to a virtual position relative to an object in a real world three-dimensional environment.

The processors of the first display device 30 and the second display device 34 execute a common anchor transfer program 38. The first display device 30 stores into local memory a local map data 32, while the second display device 34 stores into local memory a local map data 36. The local map data may include the recorded rotational and translational motions of the display devices tracked by the visual sensors and/or inertial measurement sensors in the display devices. The anchor transfer program 38 is executed in one of two modes: an export anchor mode and an import anchor mode. In FIG. 4, the first display device 30 is depicted to be executing the export anchor mode of the anchor transfer program 38, in which the first display device 30 sends anchor data 54 and serialized neighboring map data 66 to the second display device 34. The second display device 34 is depicted to be executing the import anchor mode of the anchor transfer program 38, in which the second display device 34 receives anchor data 54 and serialized neighboring map data 66 from another device 30, causing the second display device 34 to eventually incorporate the map data 66 into existing local map data 36 of the second display device 34, and causing the display 35 of the second display device 34 to display the one or more holograms to a second user operating the second display device 34 from the vantage point of the second user. The first display device 30 and the second display device 34 may be communicatively coupled to one or more other devices via a wired connection or a wireless connection to a network, but the communicative coupling is not particularly limited, and may encompass any form of data stream, including Wi-Fi, e-mail, external data storage devices, cloud storage devices, etc. In some examples, the network may take the form of a local area network (LAN), wide area network (WAN), wired network, wireless network, personal area network, or a combination thereof, and may include the Internet.

Figure 5:
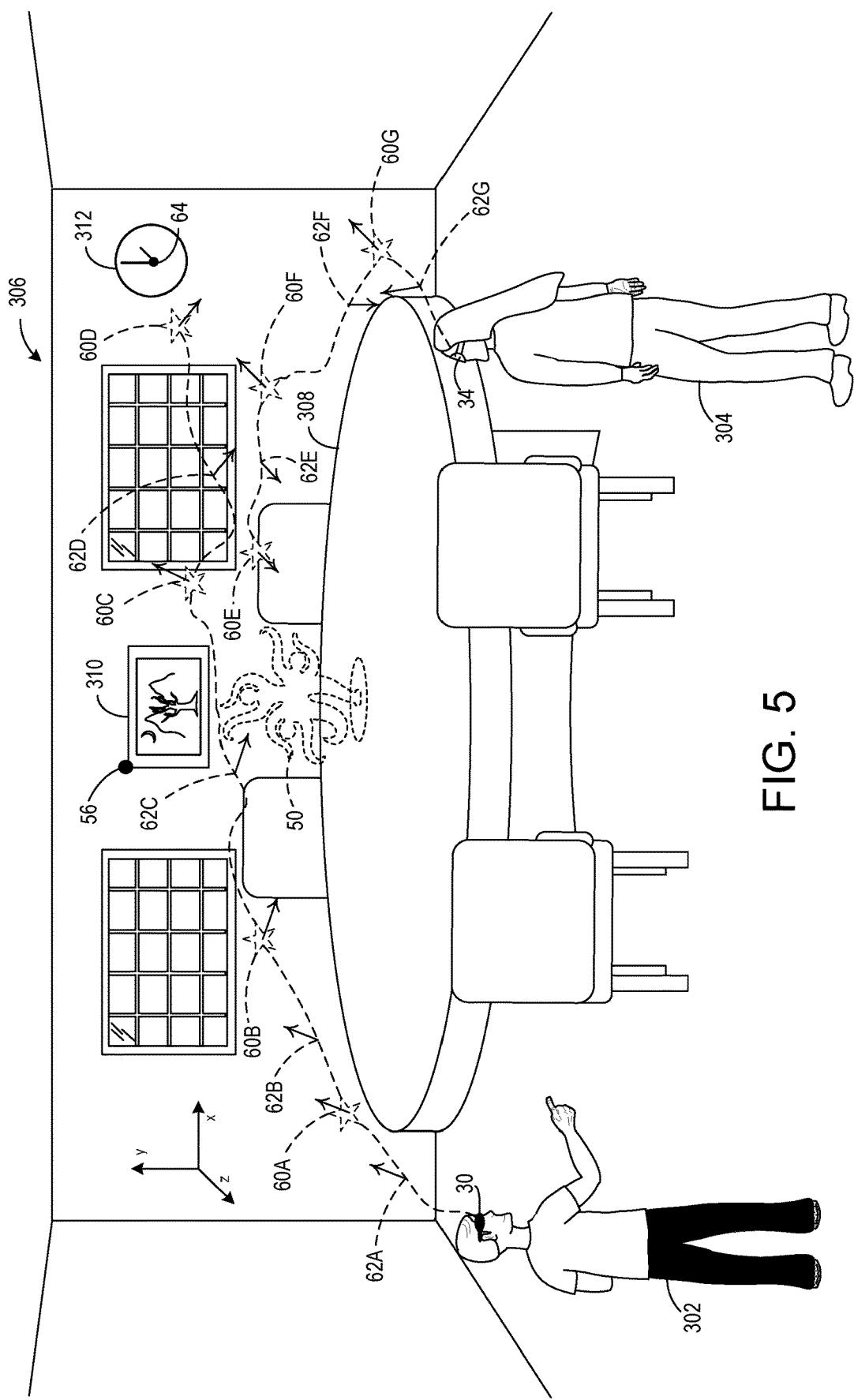
FIG. 5 shows users wearing head-mounted display devices of FIG. 1 in a dining room according to an example of the present disclosure.

With reference to FIG. 5, an example use case illustrating aspects of the present disclosure will now be presented. As schematically shown in FIG. 5, a first user 302 may be standing in a dining room 306 wearing the first display device 30, which in this example may take the form of HMD device shown in FIG. 1. However, it will be appreciated that the display devices are not particularly limited to HMD devices, and may take any form that allows users to view hologram images overlaid upon the real world three-dimensional environment, such as specialized smartphones and tablet devices, autonomous robots, etc. In some examples, the autonomous robots may be further configured to align movements with one another and with any compatible device, and to work together as autonomous systems in aligned coordinate space based on shared map data. As noted above, first display device 30 (HMD device) and the second display device 34 may comprise an at least partially see-through display configured to visually augment the views of first user 302 and second user 304, respectively, through the display of the real world three-dimensional environment of the dining room 306. The first display device 30 may generate a virtual model of the dining room 306 using a three-dimensional coordinate space overlaid upon the real world dining room. In the example of FIG. 5, such three-dimensional coordinate space is indicated by the x, y, and z axes.

As described in more detail below, the first display device 30 and second display device 34 also may include program logic of an anchor transfer program 38 configured to send and receive map data of the dining room 306. In this example, a hologram 50 is projected on a table 308 using a target anchor 56 that is on a picture 310. Another neighboring anchor 64 for another hologram is located in a clock 312 that is in the vicinity of the picture 310. The first user 302 and the second user 304 are roaming about the room 306 as they operate the first display device 30 and the second display device 34, respectively, to view the hologram 50 from various angles in the room 306 from their respective vantage points. As the users roam about the room 306, the sensors 18 within the first display device 30 and the second display device 34 capture visual and/or inertial tracking data and thereby track the rotational and translational motion of the display devices through the sensor devices 18, which observe the three-dimensional rotation and translation of the sensor device 18 to be recorded as poses 62A-G and keyframes 60A-G, which are subsequently stored as local map data 32 and local map data 36 in the first display device 30 and the second display device 34, respectively. To help each display device orient itself within the room, the display devices may be configured to observe corners in their environments, such as the four corners of each of the two depicted windows, and may use the position of these detected corners of the windows to correct their estimated position, using the predictive corrective algorithm of FIG. 2. Thus, one example of local map data that may be stored by each device is feature matching data (feature indicators, observations, and patches) indicating the detected corners of the windows in the room. Of course, it will be appreciated that corners of windows are merely one example and many other types of local map may be gathered. The local map data of each display device may be transmitted to the server computing device 200 to be stored in mass storage 218 of the server computing device 200 to be later retrieved as neighboring map data 58 if the map data corresponds to the target anchor 56 that is specified by the transfer request 48. The poses 62A-G and keyframes 60A-G are described in more detail in FIG. 7.

In the example of FIG. 5, first user 302 may wish to designate a virtual location at which to display a hologram 50 of an image of an art piece. To set up the hologram 50, the first user 302 may designate the virtual location of the virtual place-located anchor 56 via user input by operating the first display device 30, which executes an anchor transfer program 38 to send an instruction 52 to the server computing device 200 to generate a virtual place-located anchor 56 at one corner of the picture 310. The server computing device 200 instantiates an anchor program 214 to receive the instruction 52. Responsive to receiving the instruction 52, the server computing device 200 generates a virtual place-located anchor 56 on the wall next to the picture 310 and sends the anchor data 54 of the anchor 56 back to the first display device 30, which uses the anchor data 54 to view a hologram 50 of an image of the art piece. The hologram 50 has a corresponding virtual place-located anchor 56 at a virtual location that is world-locked at a fixed physical point in the three-dimensional coordinate space of the physical environment.

Alternatively, the first display device 30 may programmatically generate an instruction 52 for a virtual place-located anchor 56 at a world-locked virtual location. For example, the first display device 30 may use sensor data to programmatically identify the picture 310 in the dining room 306 as a virtual location to generate a virtual place-located anchor. In response to identifying the picture 310, the first display device 30 may programmatically transmit an instruction 52 to computing device 200 to generate a virtual place-located anchor 56 at a world-locked virtual location corresponding to a corner of the picture 310.

The first user 302 may desire to share the hologram 50 with a second user 304 who is using a second display device 34. In such a case, the first user 302 sends a transfer request 48 to the computing device 200 to transfer neighboring map data 58 corresponding to a target anchor 56 to a second display device 34. In certain embodiments, an original transfer request 47 from the second display device 34 to the first display device 30 may cause the first display device 30 to send the transfer request 48. The computing device 200 receives the request 48 to transfer neighboring map data 58 corresponding to the target anchor 56. The computing device 200 retrieves, serializes, and sends the neighboring map data 58 to the first display device 30 as serialized neighboring map data 66. The serialization process encodes the neighboring map data 58 into a proprietary format that only the computing device 200 can deserialize into a format that is readable to the display devices executing the anchor transfer program 38. The serialized neighboring map data 66 may be packaged in the form of a binary file or data stream. The computing device 200 may apply program logic of the anchor transfer program 216 to define a neighborhood of the anchor 56 to appropriately determine the neighboring map data 58 that corresponds to the anchor 56. This neighborhood may include poses 62A-G, keyframes 60A-D, a neighboring anchor 64 in the vicinity of the target anchor 56. The neighboring map data 58 is further illustrated and described in FIG. 7.

The first display device 30 receives the serialized neighboring map data 66, then sends the anchor data 54 and serialized neighboring map data 66 to the second display device 34. The second display device 34 receives the anchor data 54 and serialized neighboring map data 66, then sends the serialized neighboring map data 66 to the computing device 200. The computing device 200 receives the serialized neighboring map data 66, then deserializes the neighboring map data 58 and sends the deserialized neighboring map data 68 back to the second display device 34. The second display device 34 receives the deserialized neighboring map data 68, and then stitches the deserialized neighboring map data 68 into the local map data 36 stored in the second display device 34 to create an integrated map data. The second display device 34 uses the integrated map data to render the hologram 50 image on the display 35 of the second display device 34. The stitching process may involve combining or merging two sets of map data into one set of map data by applying a common global coordinate system corresponding to the three-dimensional coordinate space of the physical environment.

Figure 6:
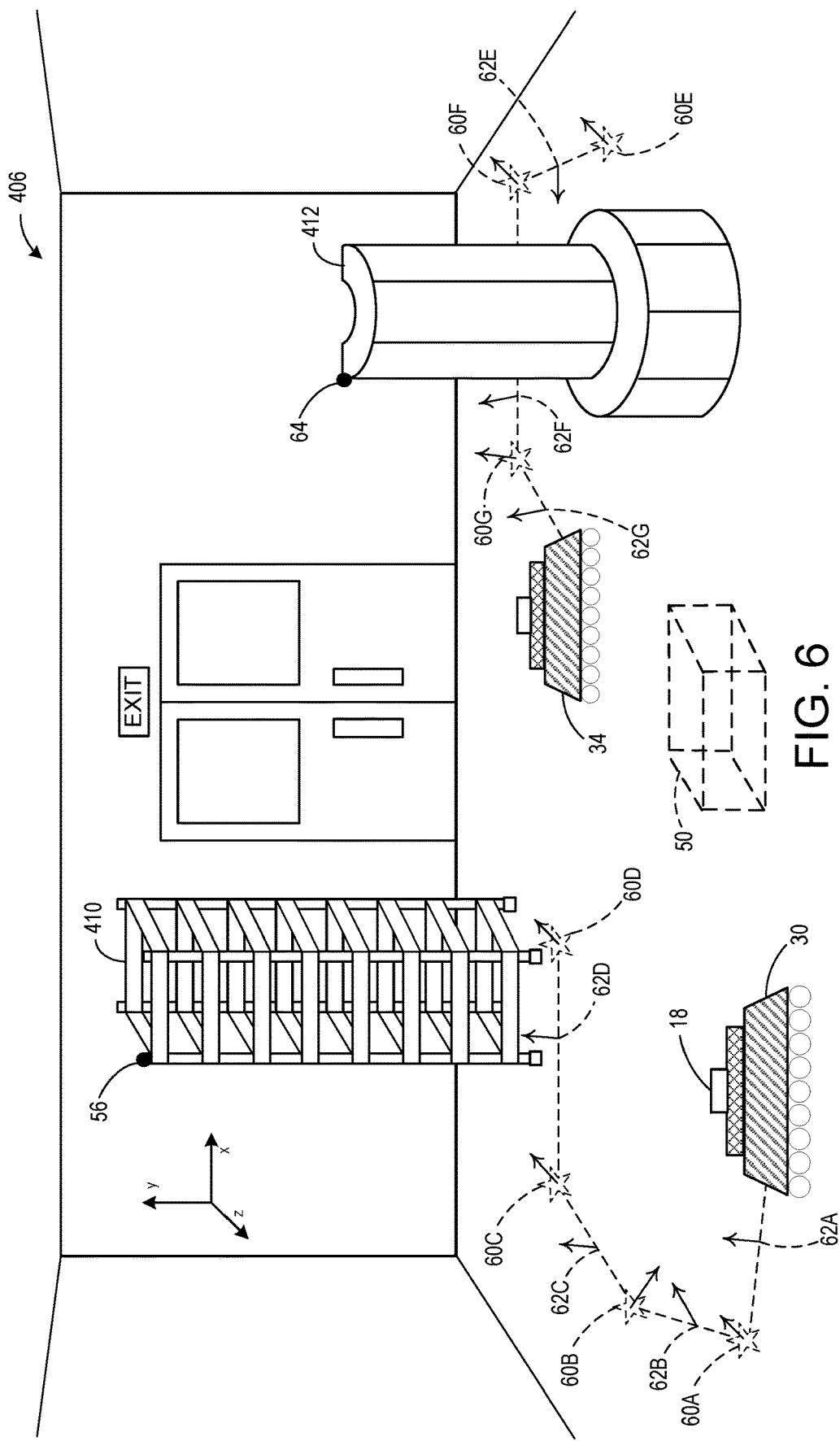
FIG. 6 shows autonomous robots in a warehouse according to another example of the present disclosure.

Turning to FIG. 6, another example use case illustrating aspects of the present disclosure with respect to autonomous robots will now be presented. Since the differences between the example use cases of FIGS. 5 and 6 mainly concern differences in the display devices and the holograms, the detailed description of the sharing of map data and the server computing device 200 is abbreviated for the sake of brevity. It is noted that like parts are designated by like reference numerals throughout the detailed description and the accompanying drawings. As shown in FIG. 6, a first robot 30 and a second robot 34 may be positioned in a warehouse 406. As the robots roam about the warehouse 406, the sensors 18 within the first robot 30 and the second robot 34 capture visual and/or inertial tracking data and thereby track the rotational and translational motion of the robots through the sensor devices 18, which observe the three-dimensional rotation and translation of the sensor device 18 to be recorded as poses 62A-G and keyframes 60A-G, which are subsequently stored as local map data 32 and local map data 36 in the first robot 30 and the second robot 34, respectively. To help each robot orient itself within the warehouse 406, the robots 30 and 34 may be configured to observe features within their environments, such as the pillars 412 and racks 410 within the warehouse 406, and may use the position of these detected features to correct their estimated position, using the predictive corrective algorithm of FIG. 2.

The robots 30 and 34 may generate a virtual model of the warehouse 406 using a three-dimensional coordinate space overlaid upon the real world warehouse 406. In this example, included in this virtual model is a hologram 50 that is anchored by a target anchor 56 that is on a rack 410. Another neighboring anchor 64 for another hologram is located on a pillar 412. With respect to the robots 30 and 34, the hologram 50 may not necessarily be embodied as images to be displayed by the robots, but may instead be embodied as virtual objects and/or virtual spaces that multiple robots can render and interact with during operation. For example, the hologram 50 may be embodied as a predetermined destination space to which a robot may be instructed to move, a predetermined work space where a robot may interact with objects, or alternatively as a predetermined prohibited space that a robot may be instructed to avoid.

When the first robot 30 shares the hologram 50 and neighboring map data with the second robot 34, the second robot 34 receives the deserialized neighboring map data and stitches the deserialized neighboring map data into the local map data 36 stored in the second robot 34 to create an integrated map data. The second robot 34 uses the integrated map data to incorporate the hologram 50 into the virtual model of the warehouse 406 that is stored in the second robot 34, so that the hologram 50 and neighboring map data of the target anchor 56 are shared in the virtual models of both robots 30 and 34. Accordingly, the autonomous robots 30 and 34 can align movements with one another and to work together as autonomous systems in aligned coordinate space based on shared map data, among which is the neighboring map data of the target anchor 56. These aligned movements may help avoid collisions with one another and with obstacles within the warehouse 406, as well as aid in performing operations that require the coordination and cooperation of multiple robots, especially in the fields of manufacturing and logistics. For example, the hologram 50 may represent a predetermined space for the first robot 30 to drop off an object, which is later picked up by the second robot 34. In another example, the hologram 50 may represent a predetermined space that the first robot 30 has already cleaned, and the first robot 30 may share the hologram 50 and neighboring map data to the second robot 34 to instruct the second robot 34 to avoid cleaning the predetermined space that the first robot 30 has already cleaned.

Figure 7:
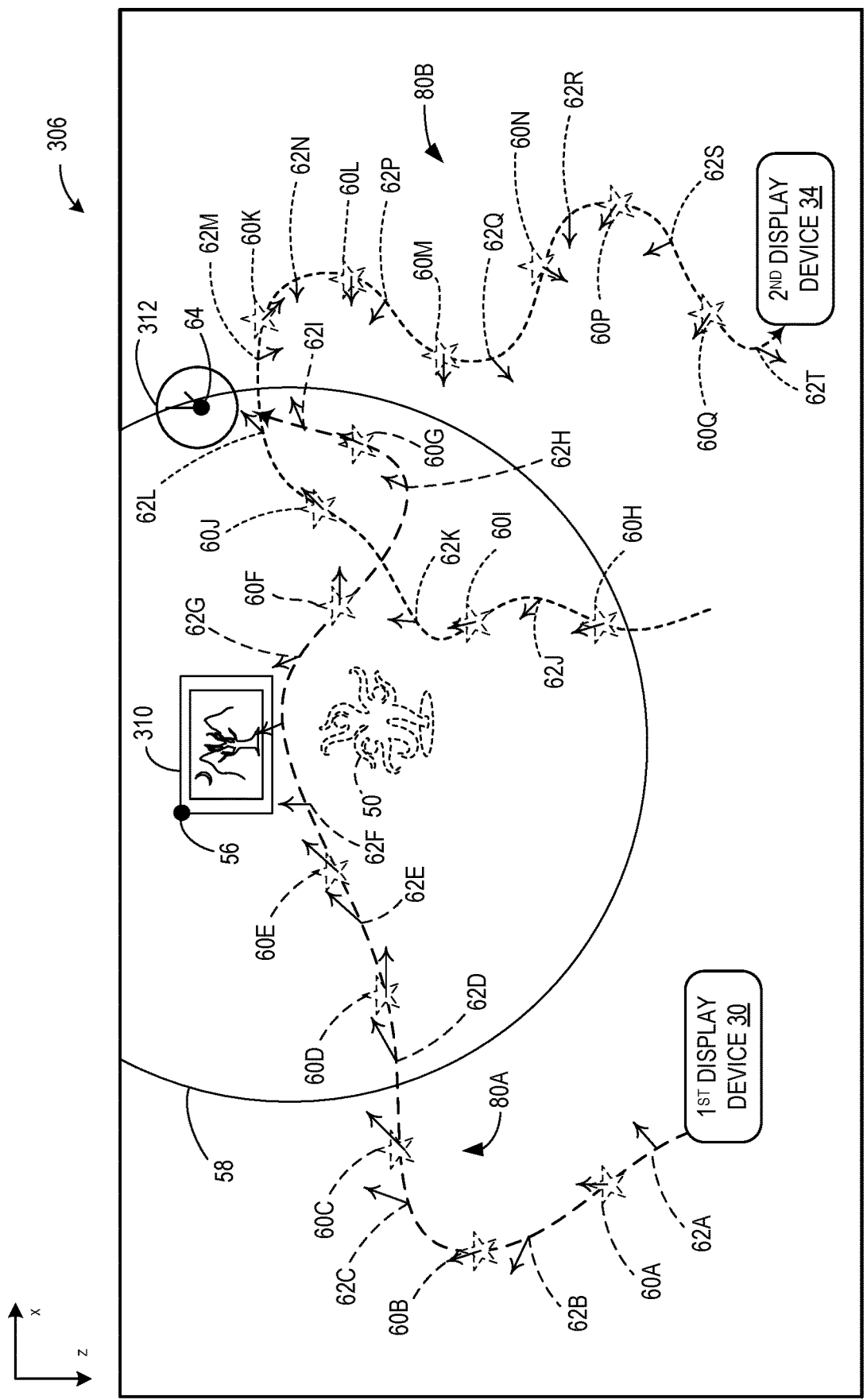
FIG. 7 is a schematic view of one embodiment of map data for each of a first and second display device, the map data for the first display device including neighboring map data of an anchor, according to an example of the present disclosure.

Turning to FIG. 7, one possible embodiment of the map data applied in the present disclosure is discussed in more detail. The information for the map data may be generated by at least a sensor device in a plurality of display devices sending sensor data, including the rotational and translational motion tracked by the sensor device, to the computing device 200 in sets that are configured as keyframes 60A-Q and pose graphs 80A, 80B, linking poses 62A-I and 62J-T, respectively. Here, two display devices and their keyframes and pose graphs are depicted, but other embodiments may feature three or more display devices in close proximity to each other, each with their own trajectories of key frames and pose graphs. Also contained in the map data are a plurality of virtual place-located anchors, including the target anchor 56 and a neighboring anchor 64 at world-locked virtual locations with known three-dimensional coordinates in the physical environment. These anchors may include visibly conspicuous features in the physical environment, such as the picture 310 and clock 312 illustrated in FIG. 5. Poses 62A-T, depicted as small arrows in the pose graphs 80A, 80B, are typically unit vectors that point in the direction of a fixed straight-ahead gaze out of the display of display device, as described above, and the pose graphs record the position of the poses in three-dimensional space over time. Individual keyframes 60A-G are linked to each other in pose graph 80A, which links poses 62A-I, while keyframes 60H-Q are linked to each other in pose graph 80B, which links poses 62J-T. The pose graphs thus include plurality of such poses linked to each other in a directed graph so as to track the changes in pose as the display devices travel through the three-dimensional coordinate space of the physical environment. The pose graphs 80A and 80B each form a linear trajectory of map data that the display devices leave behind to store as local map data and subsequently sends to the server computing device 200 for compilation and analysis as map data as the display device travels through three-dimensional coordinate space over time.

Keyframes 60A-Q contain sets of information that can be used to improve the ability of the display device to ascertain its location, and thus help render holograms in stable locations. As discussed above, examples of data included in keyframes 60A-Q include metadata, observations and patches, and/or image feature descriptors. Metadata may include the extrinsic data of the camera, the time when keyframe was taken, gravity data, temperature data, magnetic data, calibration data, global positioning data, etc. Observations and patches may provide information regarding detected feature points in a captured image, such as corners and high contrast color changes that help correct the estimation of the position and orientation of the display device, and accordingly help better align and position the display of a holographic image via display 20 in three-dimensional space. Image feature descriptors may be feature points, sometimes efficiently represented in a small data set, in some examples as small as 32 bytes, that are used the feature matching engine 13 described above to quickly recognize features in the real time captured images 18A and depth images 21A, to accurately estimate the position of the display device, and thus accurately render the hologram on the map of the physical environment. In yet other examples, keyframes 60A-Q may include Wi-Fi fingerprints representing properties of Wi-Fi beacons emitted by surrounding Wi-Fi access points, such as MAC addresses, SSIDs, and measured signal strengths.

Pose graphs 80A, 80B interlinking the keyframes may be a plurality of continuously connected poses communicating how much rotation and translation in three-dimensional space the display device undergoes between keyframes over time. Multiple anchors may be interlinked with each other via pose 62A-T. It will be appreciated that, the geometric relationship between a display device and a hologram for a given keyframe may be computed by first computing the distance between the current pose of the device and the anchor associated with the hologram, and then computing the distance between the anchor and the hologram itself.

When there is a predetermined virtual place-based anchor 56 that is known to the first display device 30 but unknown to the second display device 34, and the first display device 30 wishes to share this virtual place-based anchor 56 with the second display device 34, the server computing device 200 merely packages neighboring map data 58 surrounding the target virtual place-based anchor 56, packaging merely a subset of the anchors 56 and 64, poses 62A-T, and keyframes 60A-Q in the entire room which corresponds to a neighborhood. In the example depicted in FIG. 7, this subset includes anchors 56 and 64 and keyframes 60D-G and poses 62D-I for the first display device 30, and keyframes 60H-J and poses 62J-L for the second display device 34. In this example, the neighborhood of the neighboring map data has been defined to be the anchors, keyframes, and poses that fall within a predetermined distance of the target anchor 56. However, it will be appreciated that the neighborhood can be arbitrarily defined to encompass any shape or size of three-dimensional space surrounding or proximate to the target anchor 56, including neighborhoods that may not necessarily include the target anchor 56 itself.

Figure 8:
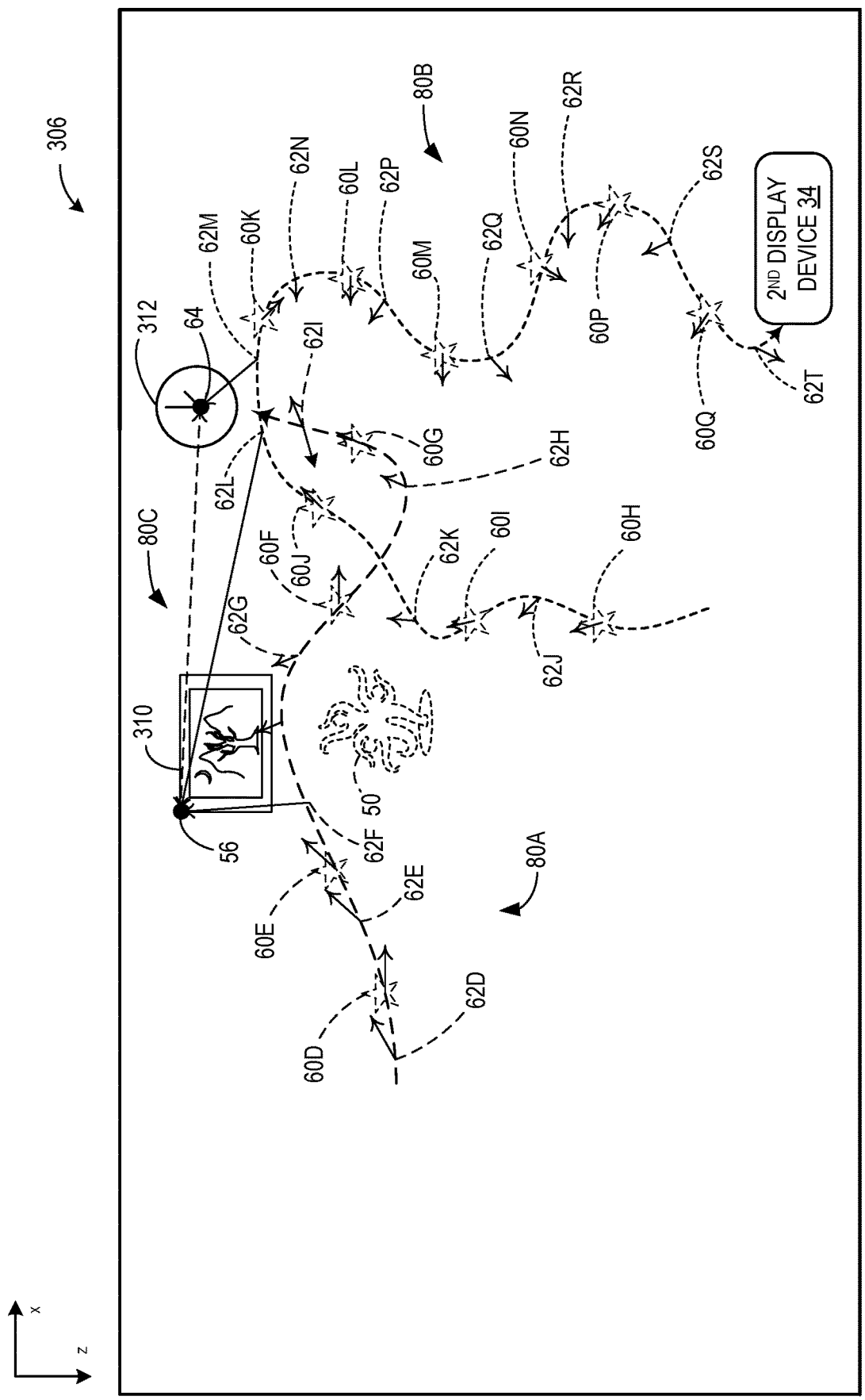
FIG. 8 is a schematic view of integrated map data of the second display device which has been formed by receiving a portion of the map data of the first display device at the second display device and stitching this received map data together with local map data of the second display device.

Referring to FIG. 8, the packaged neighboring map data is serialized and sent to the first display device 30, which is relayed to the second display device 34 and ultimately to the computing device 200, which deserializes the neighboring map data to be integrated into the local map data of the second display device 34, which includes keyframes 60H-Q and poses 62J-T. The integration of the neighboring map data into the local map data of the second display device 34, which is performed by the computing device 200 or the second display device 34, proceeds via a map stitching process illustrated in FIG. 8. It will be appreciated that the map stitching is performed by connecting pose graphs 80A and 80B of the two map data sets together, determining the spatial relationship of at least one point on pose graph 80A relative to at least one point on pose graph 80B, for example. For example, if there is at least one single anchor with spatial relationships that are already known relative to both pose graphs, then the spatial relationships of the two pose graphs relative to each other can be calculated by using the single anchor as a reference point. In this illustrated example, a pose 62F on pose graph 80A is known with reference to anchor 56, as well as a pose 62L on pose graph 80B with reference to the same anchor 56. Accordingly, anchor 56 can be used as the basis to connect pose graph 80A to pose graph 80B. Alternatively, map stitching may be performed if a pose graph connecting two anchors is known, and the two pose graphs are respectively connected to the two anchors. In this illustrated example, since the pose 62F on pose graph 80A is known with reference to anchor 56, the pose 62M on pose graph 80B is known with reference to anchor 64, and a pose graph 80C establishing the spatial relationship between anchors 56 and 64 is known, the spatial relationship between pose graphs 80A and 80B can be established using poses 62F and 62M as well as pose graph 80C. The integrated map containing both the neighboring map data and the local map data is then used to render the hologram image in the same location from the different vantage points of the first and second users at the same time. Accordingly, there is no need to copy or load the entire map of the room from another device or server. The local map data remains in place, with existing coordinates and map data intact to preserve any pre-existing content placement, thereby limiting local data loss. The computation of the neighboring map data can be flexibly optimized for various scenarios, and users can share multiple virtual place-based anchors, not being limited to one particular physical location. In addition, no external 'posters' or 'markers' are required in the physical environment to transfer the neighboring map data, so no external sensor setup is required.

Figure 9A:
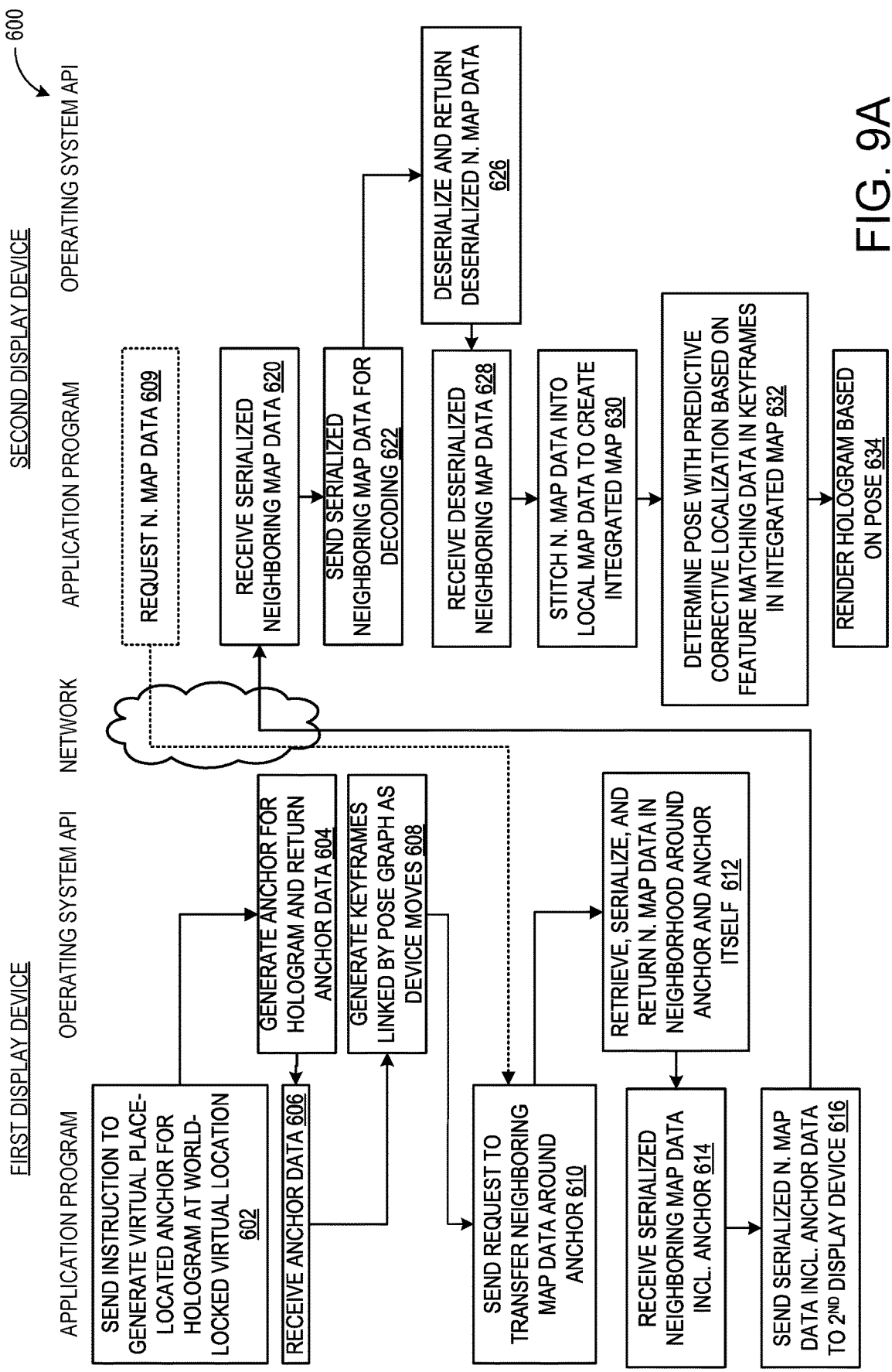
FIGS. 9A-B are flow charts of a method of sharing neighboring map data for a virtual place-located anchor according to two examples of the present disclosure.

FIG. 9A illustrates a flow chart of a first method 600 for generating a virtual place-located anchor at which holograms may be viewed according to an example of the present disclosure. The following description of method 600 is provided with reference to the software and hardware components described above and shown in FIGS. 1-10. It will be appreciated that method 600 also may be performed in other contexts using other suitable hardware and software components.

With reference to FIG. 9A, at 602 the method 600 may include the first display device sending an instruction to generate a virtual place-located anchor at a virtual location that is world-locked. At 604, the server computing device receives the instruction to generate the virtual place-located anchor at the world-locked virtual location, generates the anchor comprising anchor data, and sends the anchor data to the first display device 200. At 606, the first display device receives the anchor data. At 609, the second display device sends a request to the first display device to transfer neighboring map data to the second display device. In response, at 610, the first display device sends a request to the server computing device to transfer neighboring map data to the second display device. At 612, the server computing device receives the request to transfer neighboring map data. Subsequently, the server computing device retrieves, serializes, and sends the neighboring map data including the anchor to the first display device. At 614, the first display device receives the serialized neighboring map data including the anchor. At 616, the first display device sends the anchor data and serialized neighboring map data to the second display device. At 620 the second display device receives the anchor data and serialized neighboring map data. At 622 the second display device sends the serialized neighboring map data to the server computing device. At 626 the server computing device receives the serialized neighboring map data. Subsequently, the server computing device deserializes the neighboring map data and sends the deserialized neighboring map data back to the second display device. At 628 the second display device receives the deserialized neighboring map data. At 630 the second display device stitches the deserialized neighboring map data into the local map data stored in the second display device to create an integrated map data. At 632 the second display device determines its pose with predictive corrective localization based on feature matching data in the keyframes in the integrated map. At 634 the second display uses the determined pose and integrated map data to render the hologram image on the display of the second display device.

Figure 9B:
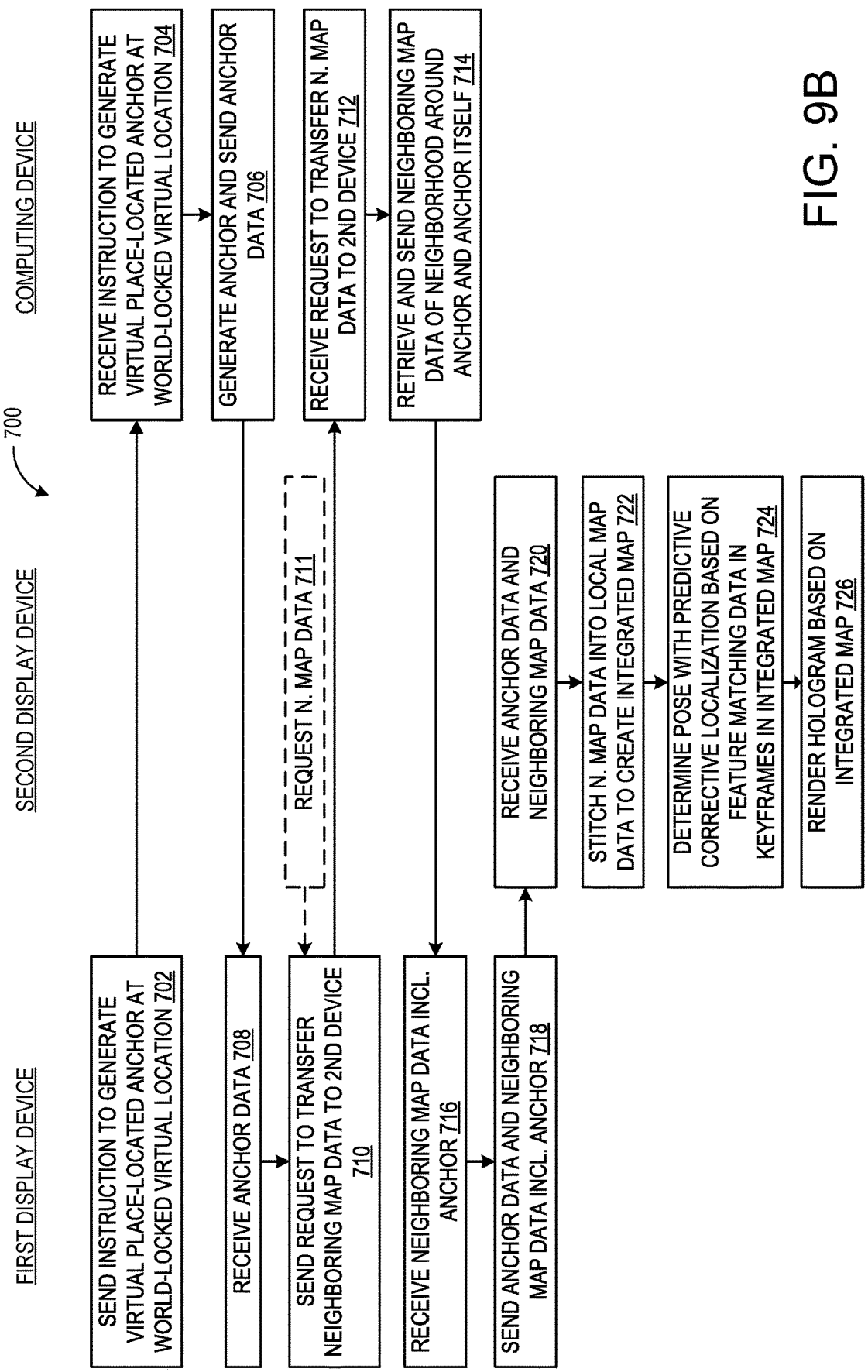

FIG. 9B illustrates a flow chart of a second method 700 for generating a virtual place-located anchor at which holograms may be viewed according to an example of the present disclosure. The following description of method 700 is provided with reference to the software and hardware components described above and shown in FIGS. 1-10. It will be appreciated that method 700 also may be performed in other contexts using other suitable hardware and software components.

With reference to FIG. 9B, at 702 the method 700 may include the first display device sending an instruction to generate a virtual place-located anchor at a virtual location that is world-locked. At 704 the server computing device receives the instruction to generate the virtual place-located anchor at the world-locked virtual location. At 706 the server computing device generates the anchor and sends anchor data to the first display device. At 708 the first display device receives the anchor data. At 710 the first display device sends a request to the computing device to transfer neighboring map data to a second display device. Optionally at 711, the second display device sends a request to the first display device to transfer neighboring map data to the second display device. At 712 the server computing device receives the request to transfer neighboring map data. At 714 the server computing device retrieves and sends the neighboring map data, including the anchor, to the first display device. At 716 the first display device receives the neighboring map data including the anchor. At 718 the first display device sends the anchor data and neighboring map data to the second display device. At 720 the second display device receives the anchor data and neighboring map data. At 722 the second display device stitches the neighboring map data into the local map data stored in the second display device to create an integrated map data. At 724 the second display device determines its pose with predictive corrective localization based on feature matching data in the keyframes in the integrated map. At 726 the second display device uses the determined pose and integrated map data to render the hologram image on the display of the second display device.

It will be appreciated that methods 600 and 700 are provided by way of example and is not meant to be limiting. Therefore, it is to be understood that methods 600 and 700 may include additional and/or alternative steps relative to those illustrated in FIGS. 9A and 9B. Further, it is to be understood that methods 600 and 700 may be performed in any suitable order. Further still, it is to be understood that one or more steps may be omitted from methods 600 and 700 without departing from the scope of this disclosure. For example, the serialization and deserialization may be performed by the first display device, second display device, and/or the server computing device. Anchor generation may be performed by the first display device, second display device, and/or the server computing device. Further, the stitching of the neighboring map data into the local map of the second display device to generate an integrated map data may alternatively be performed by the server computing device.

In summary, when establishing a shared coordinate is desired (e.g. to position a shared hologram in the three-dimensional physical environment that is properly viewed by two users at the same time from the different vantage points of the two users in the same location), a location of interest (e.g. virtual place-based anchor) is specified by the first display device, and neighboring map data around the virtual place-based anchor is constructed with most relevant map information. This neighborhood of relevant data is then packaged (exported) and shared with a second display device, and added (imported) to the local map of the second display device. Then as 6-DoF tracking continues to run on the second display device to leave behind a trajectory of linear map data that is stored as local map data, as the newly shared neighboring map data is observed by the sensors of the first display device in the real world, the shared neighboring map data is stitched into the existing local map of the second device, creating an integrated map with the newly shared location (virtual place-based anchor) relative to pre-existing locations (anchors).

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
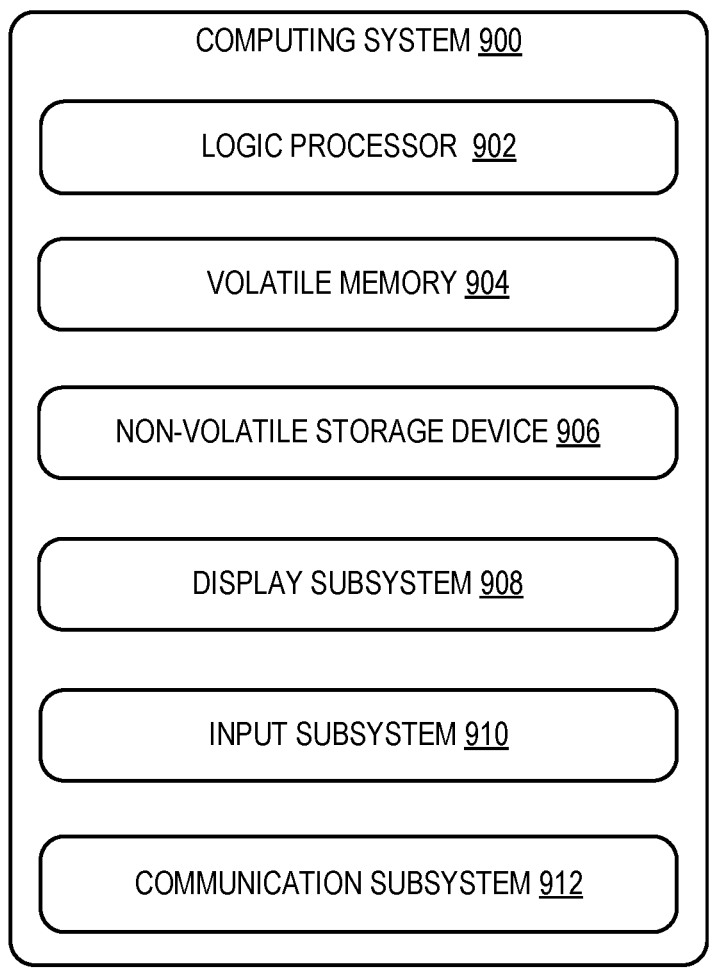
FIG. 10 shows a computing system according to an embodiment of the present disclosure.

FIG. 10 schematically shows a non-limiting embodiment of a computing system 900 that can enact one or more of the methods and processes described above. Computing system 900 is shown in simplified form. Computing system 900 may embody the computing device 10 of FIG. 1 or the server computing device 200 of FIG. 4. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 10.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as Bluetooth and HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a server computing device comprising a processor, a non-volatile storage device operatively coupled to the processor, and an anchor transfer program stored in the non-volatile storage device and executed by the processor of the computing device, the anchor transfer program being configured to receive a request to transfer anchor data of a target virtual place-located anchor at a target virtual location from a first display device to a second display device; retrieve and transmit to the second display device neighboring map data corresponding to the target virtual location, the neighboring map data being map data of a neighborhood in a vicinity around the target virtual location; cause the second display device to incorporate the neighboring map data into existing map data of the second display device; and cause the second display to display the one or more holograms at the target virtual place-located anchor at the target virtual location from the second user's vantage point based on the incorporated map data and the existing map data of the second display device. In this aspect, additionally or alternatively, the computing device may further comprise an anchor program stored in the memory and executed by the processor of the computing device, the anchor transfer program being configured to receive an instruction from the first display device to generate the target virtual place-located anchor at the target virtual location; generate the target anchor at the world-locked target virtual location; and send the target anchor to the first display device. In this aspect, additionally or alternatively, the anchor transfer program may be configured to transmit to the first display device neighboring map data in a serialized format; and the second display device may receive the neighboring map data in a deserialized format. In this aspect, additionally or alternatively, the target virtual location may be world-locked to a position that is fixed in a three-dimensional coordinate space overlaid upon a real world three-dimensional environment. In this aspect, additionally or alternatively, the target virtual location may be world-locked to a position relative to an object in a real world three-dimensional environment. In this aspect, additionally or alternatively, the neighboring map data may comprise keyframes and at least a portion of a pose-graph describing rotational and translational motion of the display devices through a real world three-dimensional environment. In this aspect, additionally or alternatively, the computing device may further comprise visual sensors and/or inertial measurement sensors, the visual sensors and/or inertial measurement sensors tracking the rotational and translational motion of the display devices for the keyframes and pose-graphs. In this aspect, additionally or alternatively, the keyframes may comprise at least one of a fingerprint of a Wi-Fi beacon, gravity data, temperature data, global positioning data, and calibration data.

Another aspect provides a method comprising receiving a request to transfer anchor data of a target virtual place-located anchor at a target virtual location from a first display device to a second display device; retrieving and transmitting map data to the first display device neighboring map data corresponding to the target virtual location; and subsequent to the first display device transferring anchor data and the neighboring map data to the second display device, causing the second display device to incorporate the neighboring map data into existing map data of the second display device, and causing the second display to display the one or more holograms to a second user at the target virtual place-located anchor at the target virtual location from the second user's vantage point based on the incorporated map data and the existing map data of the second display device, the neighboring map data being map data of a neighborhood around the target virtual location. In this aspect, additionally or alternatively, the method may further comprise receiving an instruction from the first display device to generate the target virtual place-located anchor at the target virtual location; and generating the target anchor at the world-locked target virtual location and sending the target anchor to the first display device. In this aspect, additionally or alternatively, the neighboring map data may be transmitted to the first display device in a serialized format, and the second display device may receive the neighboring map data in a deserialized format. In this aspect, additionally or alternatively, the target virtual location may be world-locked to a position that is fixed in a three-dimensional coordinate space overlaid upon a real world three-dimensional environment. In this aspect, additionally or alternatively, the target virtual location may be world-locked to a position relative to an object in a real world three-dimensional environment. In this aspect, additionally or alternatively, the neighboring map data may comprise keyframes and pose-graphs recording rotational and translational motion of the display devices through a real world three-dimensional environment. In this aspect, additionally or alternatively, visual sensors and/or inertial measurement sensors may track the rotational and translational motion of the display devices for the keyframes and pose-graphs. In this aspect, additionally or alternatively, the keyframes may comprise at least one of a fingerprint of a Wi-Fi beacon, gravity data, temperature data, global positioning data, and calibration data.

Another aspect provides a first computing device operated by a first user, networked with a second computing device and a third computing device, the first computing device comprising a processor; a memory operatively coupled to the processor and storing local map data of the first computing device; a first display operatively coupled to the memory and the processor; and an anchor transfer program stored in the memory and executed by the processor to be configured to receive first anchor data causing the first display to display one or more holograms to the first user at a first virtual place-located anchor at a first target virtual location from the first user's vantage point, and further configured to execute an export anchor mode; in the export anchor mode, the anchor transfer program being configured to receive first neighboring map data of a neighborhood around the first target virtual location; and send the first anchor data and the first neighboring map data to a second computing device, operated by a second user, thereby causing the second display to display the one or more holograms at the first virtual place-located anchor at the first target virtual location from the second user's vantage point based on the first neighboring map data and the local map data of the second computing device. In this aspect, additionally or alternatively, the anchor transfer program may further be configured to execute an import anchor mode; in the import anchor mode, the anchor transfer program being configured to receive, from a third computing device, second neighboring map data of a neighborhood around a second target virtual location; integrate the second neighboring map data into the local map data of the first computing device to create an integrated map data, and cause the first display to display the one or more holograms at the second virtual place-located anchor at the second target virtual location from the first user's vantage point based on the integrated map data.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A first computing device operated by a first user, networked with a second computing device, the first computing device comprising:
   a processor;
   a memory operatively coupled to the processor and storing local map data including at least a first pose graph created by sensor measurements of the first computing device;
   a first display operatively coupled to the memory and the processor; and
   an anchor transfer program stored in the memory and executed by the processor to be configured to receive first anchor data causing the first display to display one or more holograms to the first user at a first virtual place-located anchor at a first target virtual location from a vantage point of the first user, and further configured to execute an import anchor mode, wherein in the import anchor mode, the anchor transfer program is configured to:
      receive, from the second computing device, neighboring map data of a neighborhood around a second virtual place-located anchor at a second target virtual location including a second pose graph created by sensor measurements of the second computing device;
      incorporate, via a stitching process, the neighboring map data into the local map data of the first computing device to create integrated map data comprising keyframes, each keyframe including feature matching data, the stitching process including stitching together the second pose graph of the neighboring map data and the first pose graph of the local map data by connecting the first pose graph and the second pose graph based on a spatial relationship determined by the anchor transfer program of at least one point of the first pose graph and at least one point of the second pose graph, wherein the spatial relationship comprises the first pose graph, the second pose graph, and a third pose graph connecting the first virtual place-located anchor to the second virtual place-located anchor;
      determine a pose of the first computing device with predictive corrective localization based on the feature matching data in the keyframes of the integrated map data; and
      cause the first display to display one or more holograms at the second virtual place-located anchor at the second target virtual location from the vantage point of the first user based on the integrated map data and the determined pose.

2. The first computing device of claim 1, wherein
the anchor transfer program is configured to send an instruction to a server computing device to generate the first virtual place-located anchor at the first target virtual location, and receive the first virtual place-located anchor from the server computing device.

3. The first computing device of claim 1, wherein
the anchor transfer program is configured to receive the neighboring map data in a serialized format; and
the anchor transfer program is configured to send the neighboring map data to the second computing device in a deserialized format.

4. The first computing device of claim 1, wherein
the first target virtual location is world-locked to a position that is fixed in a three-dimensional coordinate space overlaid upon a real world three-dimensional environment.

5. The first computing device of claim 1, wherein
the first target virtual location is world-locked to a position relative to an object in a real world three-dimensional environment.

6. The first computing device of claim 1, wherein
the neighboring map data comprises keyframes and at least a portion of a pose-graph describing rotational motion and translational motion of the first computing device and the second computing device through a real world three-dimensional environment.

7. The first computing device of claim 6, further comprising:
visual sensors and/or inertial measurement sensors, wherein
the visual sensors and/or inertial measurement sensors track the rotational motion and translational motion of the first computing device and second computing device for the keyframes and pose-graphs.

8. The first computing device of claim 7, wherein
the keyframes comprise at least one of a fingerprint of a Wi-Fi beacon, gravity data, temperature data, global positioning data, and calibration data.

9. A method for a first computing device operated by a first user, networked with a second computing device, the method comprising:
storing local map data including at least a first pose graph created by sensor measurements of the first computing device;
receiving first anchor data causing a first display of the first computing device to display one or more holograms to the first user at a first virtual place-located anchor at a first target virtual location from a vantage point of the first user, and executing an import anchor mode, wherein
in the import anchor mode:
neighboring map data is received from the second computing device of a neighborhood around a second virtual place-located anchor at a second target virtual location including a second pose graph created by sensor measurements of the second computing device;
via a stitching process, the neighboring map data is incorporated into the local map data of the first computing device to create integrated map data comprising keyframes, each keyframe including feature matching data, the stitching process including stitching together the second pose graph of the neighboring map data and the first pose graph of the local map data by connecting the first pose graph and the second pose graph based on a spatial relationship of at least one point of the first pose graph and at least one point of the second pose graph, wherein the spatial relationship comprises the first pose graph, the second pose graph, and a third pose graph connecting the first virtual place-located anchor to the second virtual place-located anchor;
a pose of the first computing device is determined with predictive corrective localization based on the feature matching data in the keyframes of the integrated map data; and
the first display is caused to display one or more holograms at the second virtual place-located anchor at the second target virtual location from the vantage point of the first user based on the integrated map data and the determined pose.

10. The method of claim 9, further comprising:
sending an instruction to a server computing device to generate the first virtual place-located anchor at the first target virtual location; and
receiving the first virtual place-located anchor from the server computing device.

11. The method of claim 9, wherein
the neighboring map data is received in a serialized format; and
the neighboring map data is sent to the second computing device in a deserialized format.

12. The method of claim 9, wherein
the first target virtual location is world-locked to a position that is fixed in a three-dimensional coordinate space overlaid upon a real world three-dimensional environment.

13. The method of claim 9, wherein
the first target virtual location is world-locked to a position relative to an object in a real world three-dimensional environment.

14. The method of claim 9, wherein
the neighboring map data comprises keyframes and at least a portion of a pose-graph describing rotational motion and translational motion of the first computing device and the second computing device through a real world three-dimensional environment.

15. The method of claim 14, wherein
visual sensors and/or inertial measurement sensors track the rotational motion and translational motion of the first computing device and the second computing device for the keyframes and pose-graphs.

16. The method of claim 14, wherein
the keyframes comprise at least one of a fingerprint of a Wi-Fi beacon, gravity data, temperature data, global positioning data, and calibration data.

* * * * *